US012600082B2

(12) United States Patent
Gasperini et al.

(10) Patent No.: US 12,600,082 B2
(45) Date of Patent: Apr. 14, 2026

(54) DISPENSING HEAD FOR CONTINUOUS FIBER REINFORCED FUSED FILAMENT TYPE ADDITIVE MANUFACTURING

(71) Applicants: Nederlandse Organisatie voor toegepast-natuurwetenschappelijk onderzoek TNO, s'-Gravenhage (NL); Chemelot Scientific Participations B.V., Geleen (NL)

(72) Inventors: Andrea Gasperini, Utrecht (NL); Cesar Augusto Stupp, Sittard (NL)

(73) Assignees: Nederlandse Organisatie voor toegepast-natuurwetenschappelijk onderzoek TNO, 's-Gravenhage (NL); Chemelot Scientific Participations B.V., Geleen (NL)

( * ) Notice: Subject to any disclaimer, the term of this patent is extended or adjusted under 35 U.S.C. 154(b) by 638 days.

(21) Appl. No.: 17/640,482

(22) PCT Filed: Sep. 10, 2020

(86) PCT No.: PCT/NL2020/050560
§ 371 (c)(1),
(2) Date: Mar. 4, 2022

(87) PCT Pub. No.: WO2021/049935
PCT Pub. Date: Mar. 18, 2021

(65) Prior Publication Data
US 2022/0410467 A1 Dec. 29, 2022

(30) Foreign Application Priority Data
Sep. 10, 2019 (EP) ..................................... 19196361

(51) Int. Cl.
B29C 64/118 (2017.01)
B29C 64/209 (2017.01)
(Continued)

(52) U.S. Cl.
CPC .......... B29C 64/118 (2017.08); B29C 64/209 (2017.08); B29C 64/232 (2017.08);
(Continued)

(58) Field of Classification Search
CPC ..... B29C 64/00; B29C 64/118; B29C 64/232; B29C 64/295; B29C 64/209; B29C 64/241; B33Y 30/00
See application file for complete search history.

(56) References Cited

U.S. PATENT DOCUMENTS 5,906,286 A * 5/1999 Matsuno .............. B65D 1/0284
220/675
2013/0056910 A1* 3/2013 Houbertz-Krauss ... B33Y 30/00
264/401

(Continued)

FOREIGN PATENT DOCUMENTS

CN 107322922 A 11/2017
CN 207140349 U 3/2018
(Continued)

OTHER PUBLICATIONS

JPH11173757A english translation (Year: 1999).*
(Continued)

*Primary Examiner* — Larry W Thrower
(74) *Attorney, Agent, or Firm* — Leydig, Voit & Mayer, Ltd.

(57) ABSTRACT

The present document relates to a dispensing head for continuous fiber reinforced fused filament type additive manufacturing. The dispensing head is configured for dispensing a material onto a substrate carrier platform, and comprises one or more inlets for receiving a strand of meltable solid material and a reinforcement fiber and a material passage extending from the receiving inlets to a dispensing outlet. The dispensing head further comprises a (Continued)

material heating unit for liquefying the material and drive means for driving the material through the material passage. The material heating unit comprises a solid radiation body extending from the dispensing outlet at least in a direction parallel to the substrate carrier platform, defining a radiation face toward the substrate carrier platform, wherein the radiation body is thermally separated from the dispensing outlet.

11 Claims, 7 Drawing Sheets

(51) Int. Cl.

| | |
|---|---|
| *B29C 64/232* | (2017.01) |
| *B29C 64/241* | (2017.01) |
| *B29C 64/295* | (2017.01) |
| *B33Y 10/00* | (2015.01) |
| *B33Y 30/00* | (2015.01) |

(52) U.S. Cl.
CPC .......... *B29C 64/241* (2017.08); *B29C 64/295* (2017.08); *B33Y 10/00* (2014.12); *B33Y 30/00* (2014.12)

(56) References Cited

U.S. PATENT DOCUMENTS

| | | | |
|---|---|---|---|
| 2016/0361869 A1* | 12/2016 | Mark ..................... | B33Y 50/02 |
| 2017/0334137 A1 | 11/2017 | Nystrom et al. | |
| 2020/0262153 A1* | 8/2020 | Arao ..................... | B29C 64/118 |

FOREIGN PATENT DOCUMENTS

| | | | | |
|---|---|---|---|---|
| CN | 107139459 B | 2/2019 | | |
| EP | 3124217 A2 | 2/2017 | | |
| JP | H11173757 A * | 7/1999 | | |
| WO | WO-2015009938 A1 * | 1/2015 | .......... | B29C 70/384 |
| WO | WO 2019/141892 A1 | 7/2019 | | |

OTHER PUBLICATIONS

European Patent Office, International Search Report in corresponding International Application No. PCT/NL2020/050560, dated Dec. 14, 2020 (3 pages).

* cited by examiner

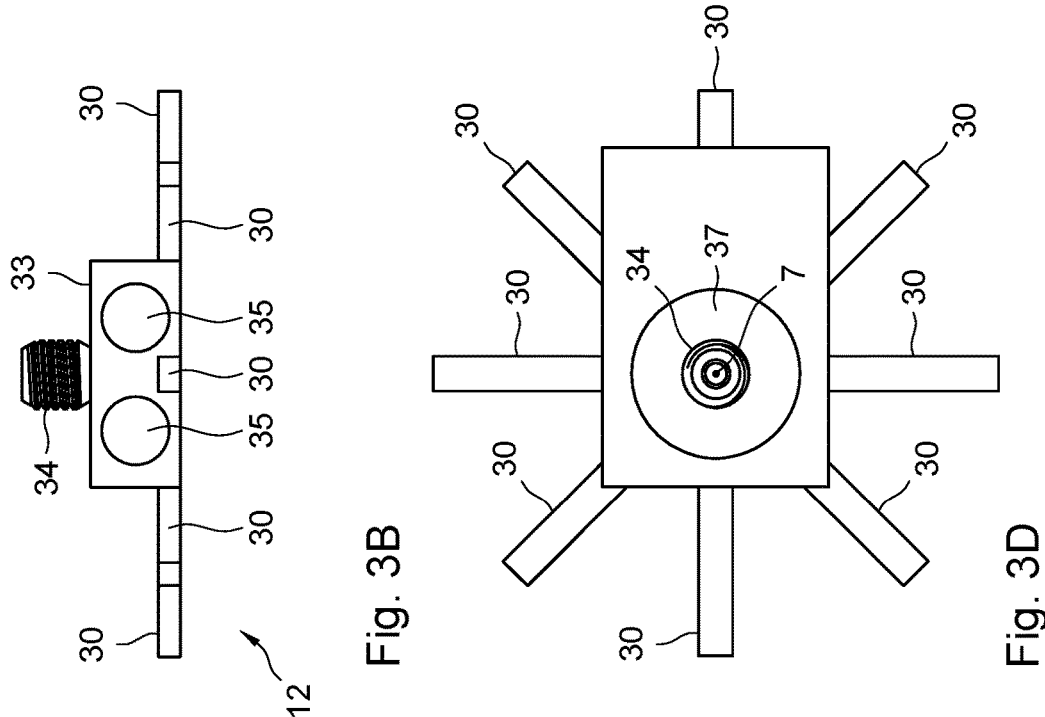
Fig. 3B
Fig. 3D
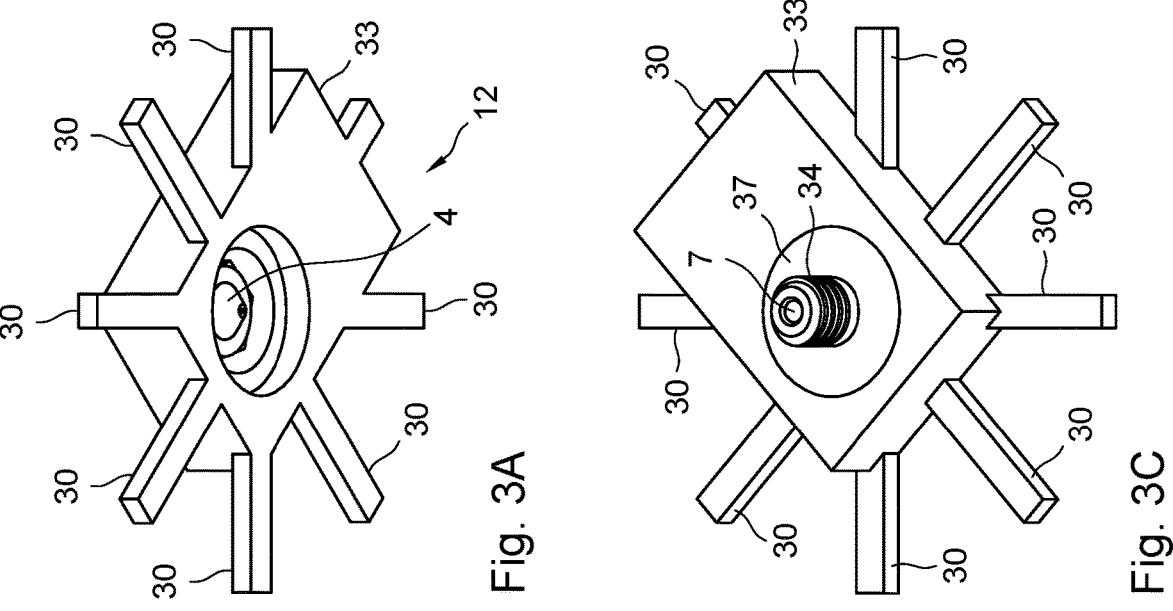
Fig. 3A
Fig. 3C

DISPENSING HEAD FOR CONTINUOUS FIBER REINFORCED FUSED FILAMENT TYPE ADDITIVE MANUFACTURING

CROSS-REFERENCE TO RELATED APPLICATIONS

This patent application is a U.S. National Phase of PCT International Application No. PCT/NL2020/050560, filed Sep. 10, 2020, which claims priority to European Application No. 19196361.0, filed Sep. 10, 2019, which are both expressly incorporated by reference in their entireties, including any references contained therein.

FIELD OF THE INVENTION

The present invention is directed at a dispensing head for continuous fiber reinforced fused filament type additive manufacturing, the dispensing head being configured for dispensing a material onto a substrate carrier platform of an additive manufacturing apparatus, the dispensing head comprising one or more inlets for receiving at least a strand of meltable solid material and a reinforcement fiber, at least one passage extending from the one or more receiving inlets to a dispensing outlet for dispensing the material with the reinforcement fiber to serve as build material, the at least one passage including a material passage, the dispensing head further comprising a material heating unit for liquefying the material, and drive means for driving the material through the material passage by engagement of the strand of solid material. The invention is further directed at a material heating element for use in a dispensing head, a method of manufacturing an object by means of fused filament type additive manufacturing, and an additive manufacturing apparatus.

BACKGROUND

The mechanical properties of 3D-printed parts currently lag behind those of conventionally manufactured parts due to the presence of high volume percent of voids and the incomplete welding between extruded adjacent and overlaid polymer lines. The reason for this limitation is because polymer interfacial diffusion and filament bonding only occur if the polymer is heated above its critical sintering temperature.

Continuous fiber reinforced fused deposition modeling (FDM) is an additive manufacturing technique that uses a dispensing head wherein a thermoplastic material is heated to extrude the molten material through a nozzle for deposition of the material onto a substrate or substrate carrier. The molten build material bears a reinforcement fiber that is embedded in the printed layer. The material is supplied to the dispensing head in the form of a wire or filament, which is molten by a heater such as to liquefy the material for depositing by the nozzle. The reinforcement fiber is added by including it in the molten material. The depositing is controlled on the basis of printing data. Because of the limited time the extruded polymers and its surrounding line spend at high temperatures, continuous fiber reinforced fused deposition modeling (FDM) produces parts with incomplete filament bonding and creation of mechanical failure points. Furthermore, the molten material between the internal heater and the nozzle outlet may clog easily in use, especially if the temperature of the material passage drops. In US2017/0072633, an FDM method has been proposed that uses pre-heating of the carrier or underlaying substrate layer, prior to deposition of the material. Apart from the additional optics required, another disadvantage of this method is that a laser illuminates the surface at a single wavelength, whereas the absorption spectrum of any arbitrary material typically consists of many wavelengths for which the material is responsive. Moreover, these absorption are different for each material, hence the results achieved with pre-heating in the manner proposed are rather material dependent.

SUMMARY OF THE INVENTION

It is an object of the present invention to provide a continuous fiber reinforced fused deposition modelling technique wherein the problems described above are overcome, and which provides for efficient and well controllable heating of the substrate or carrier material underneath the location of printing in order to prevent the presence of voids and the incomplete welding and provide a strong interlayer bonding.

To this end, there is provided herewith a dispensing head for continuous fiber reinforced fused filament type additive manufacturing, the dispensing head being configured for dispensing a material onto a substrate carrier platform of an additive manufacturing apparatus, the dispensing head comprising one or more inlets for receiving at least a strand of meltable solid material and a reinforcement fiber, at least one passage extending from the one or more receiving inlets to a dispensing outlet for dispensing the material with the reinforcement fiber to serve as build material, the at least one passage including a material passage, the dispensing head further comprising a material heating unit for liquefying the material, and drive means for driving the material through the material passage by engagement of the strand of solid material, wherein the material heating unit comprises a solid radiation body extending from the dispensing outlet at least in a direction parallel to the substrate carrier platform in use, defining a radiation face toward the substrate carrier platform, wherein the radiation body is thermally separated from the dispensing outlet.

In accordance with the present invention heating of the material is performed by a material heating unit that comprises a solid radiation body. The solid radiation body extends from the dispensing outlet in a direction parallel to the substrate carrier platform in use. It thereby defines a radiation face towards the carrier platform to enable heat transfer by radiation from the solid radiation body. The radiation body is thermally separated from the dispensing outlet to prevent heat transfer between the solid radiation body and the dispensing head. This is preferred, because in this manner the solid radiation body can achieve a high temperature, where as at the same time the material in the dispensing head can be kept at low temperature. As a result, while moving the dispensing head relative to the substrate service, the radiation from the solid radiation body pre-heats the surface of the substrate carrier platform or the substrate layer thereon. The surface underneath may thereby be heated up to a high temperature such as to result in melting of the material from the dispensing outlet upon touching the surface. As a result, the material is heated up from below to a temperature which is well above the critical sintering temperature to thereby achieve the desired bonding strength. Additionally, this overcomes the need for an internal heating element in order to heat the strand of solid material and the fiber, which is typically present in conventional continuous fiber reinforced fused deposition modelling apparatuses. Therefore, clogging of the material passage does not occur.

The use of a solid radiation body has the further advantage that radiation is emitted from the solid radiation body across a large range of wavelengths. As a result, the material underneath the layer to be printed is efficiently heated to the desired temperature. Because the radiation is emitted across a large range of wavelengths, heat transfer takes places efficiently for many materials, and the results of the method are therefore material independent. For example, already the material of the carrier platform itself largely differs from the material of the substrate to be printed, and due to the use of a solid radiation body a sufficiently high temperature easily be achieved for both types of materials. Moreover, in multi material printing arrangements, the material of the substrate may locally differ dependent on the printing requirements. Also here, the use of a solid radiation body in accordance with the present invention enables efficient heating of the substrate locally for any local material encountered.

The method of the present invention may well be applied to continuous fiber reinforced type fused deposition modelling as described. In this technique, the material to be printed on to the substrate carrier platform or substrate contains a reinforcement fiber that causes the end product to be strongly reinforced. Although many different types of dispensing heads exist for continuous fiber type fused deposition modelling, the application of a solid radiation body as proposed by the present invention may be applied to any type of dispensing head for this purpose.

In accordance with some embodiments, at least one receiving inlet is configured for receiving the strand of meltable solid material including the reinforcement fiber embedded therein. This type of dispensing heads has only one inlet for strands with embedded fiber in a prefabricated arrangement. In other embodiments, at least one receiving inlet is a fiber inlet configured for receiving the reinforcement fiber, the at least one passage further comprising a fiber passage extending from the fiber inlet to the material passage for combining the one or more fiber strands with the material. In some of these latter embodiments, the dispensing head further comprises a further heating unit operatively associated with the material passage to form a liquefying zone for liquefying material in the material passage and located between the receiving inlet and the dispensing outlet, wherein the fiber passage extends from the fiber inlet to at least one of the liquefying zone or the material passage downstream of the liquefying zone for enabling embedding of the reinforcement fiber in the material upon combining thereof with the molten material in use. This latter—the application of a further heating unit—is not required with the present invention. The fiber may be embedded by depositing the build material on the surface of the substrate or carrier platform, e.g. by depositing the fiber first and the build material thereafter such as to melt on top of the fiber to thereby embed it in the substrate to be printed.

In some embodiments, the solid radiation body is shaped such as to, from the dispensing outlet in a radial direction, gradually decrease the height of the radiation face above the substrate carrier platform or a substrate surface located thereon, such as to provide a compacting area for exerting pressure on the build material deposited. The advantage of providing a confecting area is that upon printing of the build material on the substrate surface, by exerting pressure on the build material any voids in the build material are pressed out. Moreover, in combination with the solid radiation body which heats the build material from below, directly upon leaving the dispensing outlet or nozzle part the top surface of the build material is still relatively cold and solid while the heat is not yet fully distributed. The lower part of the build material which is in touch with the surface underneath is already molten, and exerting pressure from above advantageously makes use of the more solid upper part of the build material to press out any locked-in gas at the interface with the preceding layer. In some embodiments, for this purpose, the dispensing head further comprises a compacting element, wherein the compacting element is thermally isolated from the solid radiation body such as to maintain at a lower temperature than the temperature of the solid radiation body in use, and wherein the compacting element comprises a compacting surface for facing the substrate carrier platform, wherein the compacting element is shaped such as to, from the dispensing outlet in a radial direction, gradually decrease the height of the compacting surface above the substrate carrier platform or a substrate surface located thereon.

The solid radiation body of the present invention may be made of any suitable material that allows for heat transfer across a desired range of wavelengths, such as to enable efficient heating of the substrate surface. In some preferred embodiments of the dispensing head according to the present invention, and least one of: the radiation body is made of a material including at least one element of a group comprising: metal, a ceramic, or a thermosetting polymer; or the radiation body is made of metal and the radiation face of the radiation body comprises a metal oxide surface; or the radiation body is made of metal and the radiation face comprises a coating layer of a material providing the radiation body with an emissivity in excess of an emissivity of the metal. A radiation body having a high emissivity is preferred because this allows radiation of heat to take place efficiently.

Ceramics are known for having a high emissivity and may therefore well be used for providing the solid radiation body. Also metals have a sufficiently high emissivity, al be it less than ceramics. Metal oxide, like ceramics, provide solid radiation bodies with sufficient high emissivity. In addition to a high emissivity, the material of which the solid radiation body may be manufactured is desired to be characterized by excellent heat conducting capabilities, i.e. a large heat conduction coefficient. Metals are known for conducting heat well.

Therefore, most advantageously and in a preferred embodiment, the solid radiation body is made of a metal having a radiation face that comprises a metal oxide surface. For example, an iron or steel solid radiation body having a rusted radiation face provides both excellent internal heat conduction and a large emissivity at the surface. As may be appreciated, a metal having a metal oxide surface may easily be obtained by oxidation of the metal component, and thus be created and relatively low costs. In accordance with further embodiments, in stead of a metal oxide radiation face, the radiation face of the solid radiation body may also comprise a coating layer of a material which provided with a sufficiently high emissivity that is higher than the emissivity of the metal.

In accordance with some embodiments, the radiation body extends from the dispensing outlet in at least one direction defining a relative travel direction of the dispensing head relative to the substrate carrier platform in use, such that the radiation body extends in at least one of a forward or backward direction with respect to the travel direction in use.

In these embodiments, the solid radiation body has a longitudinal shape, or includes an element that extends in a longitudinal direction, and may be mounted to the dispensing head in such a manner that the radiation body extends in either one of the forward or backward direction with respect to the travel direction in use. As a result, during the relative travelling of the dispensing head over the substrate surface or the carrier platform, the solid radiation body resides over the surface of the substrate or carrier platform for an extended duration (dependent on the relative velocity of the dispensing head over the substrate surface, and the length of the longitudinal part). Furthermore, if any further parts of the solid radiation body, e.g. sideways from the longitudinal direction, are absent, any heat that is applied to the solid radiation body is effectively applied for heating up the longitudinal part that causes pre heating of the substrate surface for printing.

In accordance with some embodiments, the radiation body is at least one of: a bar; a plurality of bars or legs extending in multiple directions from the dispensing outlet, a disc; or a circumferential element providing the radiation face and enclosing the dispensing outlet.

As may be appreciated, a plurality of bars in multiple directions enables to move the dispensing head relative to the substrate service in these directions wherein the bars or legs of the solid radiation body extend. A disk shape element allows to move the dispensing head relative to the substrate surface in any arbitrary direction, but has the disadvantage that the full element is to be heated at all times. A star shaped element defines a plurality of travel directions wherein the dispensing head may travel relative to the substrate surface, and have the benefit that it only contains material in these directions so that less heat disappears in unused directions. A single bar has the disadvantage that it only allows to radiate heat in one direction of travel (or to if forward and backward direction are considered different directions). The benefit of a bar shapes solid radiation body is that no heat is disappeared in any other direction than the travel direction defined by the bar. As mentioned above, in fact any circumferential element may be used for achieving at least part of the benefits of the present invention.

In accordance with some embodiments, the solid radiation body provides the radiation face having an elongated shape, and wherein the solid radiation body suspends from or is mounted to the dispensing head in a rotatable manner, further comprising a rotation actuator for rotating the solid radiation body relative to the dispensing outlet, wherein the rotation actuator is configured for cooperating with a controller such as to align the elongated shape of the radiation body with a direction of relative motion between the dispensing head and the substrate carrier platform in use. For example, an elongated shape could be a bar shape element, which is rotated around the dispensing outlet dependent on the travel direction of the dispensing head relative to the substrate surface. The controller of the dispensing head may cause the solid radiation body to follow the travel direction of the dispensing head relative to the substrate surface. The advantage of these types of embodiments is that a relatively small and compact (e.g. bar shapes) solid radiation body may be used which can be rotated around the dispensing head such as to enable the dispensing head to travel in any arbitrary direction without dissipating heat in unused directions.

In accordance with some embodiments, the dispensing head further comprises a height adjustment actuator cooperating with the solid radiation body, for adjusting the height of the radiation face above the substrate carrier platform or a substrate surface located thereon, wherein the height adjustment actuator is configured to be controlled by a controller for adjusting said height dependent on an areal density of printed material in an area surrounding a deposition location on the substrate surface in use. A height adjustment actuator is controlled by the controller and may therefore advantageously be used for adjusting the height of the solid radiation body above the substrate surface. For example, if some part of the substrate is desired to receive less heat than other parts of the surface, the solid radiation body can be moved up relative to the substrate surface such as to increase the height and decrease the heat transfer to the surface. This may be advantageous in areas where the areal density of printed material near the deposition location is small and thereby heats up faster than other areas. For example, an object having an edge of a wall or other elements surrounded by voids will heat up more faster because access heat can only travel trough the substrate material insubstantially the downward direction because less building material is locally present in the substrate, the substrate heats up much faster. To prevent this from happening, the height adjustment actuator may be controlled such as the moved solid radiation body upwards to decrease the height transfer. Reversely, in areas where a lot of printing material is present locally across the area, the height adjustment actuator may be moved downward to increase the heat transfer.

In accordance with some further embodiments, the dispensing head further comprises a controller for controlling the heating elements, such as to control a temperature of the solid radiation body. Although the temperature of the solid radiation body is more difficult to control than the height thereof, the increase or decrease of the temperature of the solid radiation body may be beneficial in some situations wherein heat transfer can be insufficiently controlled by a control of the height adjustment actuator.

In accordance with some embodiments wherein the dispensing head comprises a rotatable solid radiation body having an elongated shape, the controller is further configured for controlling the rotation actuator, wherein the rotation actuator is controlled dependent under direction of motion between the dispensing head and the substrate carrier platform for aligning the solid radiation body. Likewise, in other embodiments or in the dispensing head comprises a height adjustment actuator, the controller is further configured for controlling the height adjustment actuator, wherein the height of the radiation face is controlled dependent on the areal density of printed material in the area surrounding the deposition location on the substrate surface in use. The advantages of these embodiments have been explained above. The controller has access to the printing data, and also to printing data of previous layers underneath the substrate surface. This can be used to accurately control the height end or the rotation direction solid radiation body.

In accordance with a second aspect thereof, the present invention provides a method of manufacturing an object by means of continuous fiber reinforced fused filament type additive manufacturing, the method comprising: dispensing, by a dispensing head, a material onto a substrate carrier platform of an additive manufacturing apparatus, the dispensing comprising: receiving a strand of solid material via at least one of one or more receiving inlets; receiving a reinforcement fiber via at least one of the one or more receiving inlets; driving, using a driving actuator, the material and the reinforcement fiber through a passage by engagement of at least one of the strands of solid material or the reinforcement fiber, for passing the material and the reinforcement fiber to a dispensing outlet; and heating the material for bringing the material in a liquefied state such as to serve as build material; wherein the heating comprises heating at least one of the substrate carrier platform or a substrate surface on the platform by radiating heat, using a material heating unit via a solid radiation body extending from the dispensing outlet at least in a radial direction to define a radiation face toward the substrate carrier platform, wherein the radiation body is thermally separated from the dispensing outlet.

This method may be applied in combination with various control methods. For example, in accordance with some embodiments the method further comprises controlling, using a controller, a temperature of the solid radiation body, wherein the controlling includes: estimating a residence time of the dispensing head above an area of at least one of a substrate surface or the substrate carrier platform based on printing data for a layer of the object; setting the temperature reversely dependent on the residence time estimated. The residence time of the dispensing head above an area of the substrate surface or the substrate carrier platform can be easily determent by the controller by considering the printing data for one layer of the object to be printed. Once the residence time is known, the temperature of the solid radiation body, or the height radiation thereof can be adapted based on the estimated residence time. For example the temperature can be set reversely dependent on the residence time estimated.

In accordance with some further embodiments, at least one of the material heating element order dispensing head comprises a height adjustment actuator cooperating with a solid radiation body, and wherein the controlling further comprises: determining, by the controller using the printing data, an areal density of printed material in an area surrounding a deposition location on the substrate surface; and adjusting, by the controller using the height adjustment means, a height of the radiation face above the substrate carrier platform or the substrate surface located thereon, dependent on the determined areal density of printed material.

It has been explained hereinabove, that the height of the solid radiation body may be made dependent on the areal density of printing material and also dependent on an amount of material underneath the upper layer. By considering the printing data on the substrate, the controller may easily adapt the height of the solid radiation body dependent on the amount of heat transfer desired.

In accordance with some embodiments, the radiation face has an elongated shape and wherein the solid radiation body is mounted to the dispensing head in a rotatable manner, and wherein the controlling further comprises: determining, by the controller, a direction of relative motion between the dispensing head and the substrate carrier platform based in the printing data; and rotating, using a rotation actuator, the solid radiation body relative to the dispensing outlet such as to align the elongated shape of the radiation body with the direction of relative motion. It has been explained above, that determining and desired direction of the rotation the solid radiation body may easily perform by the controller under basis of the printing data.

The method, in some embodiments, may further comprise a step of post-heating of the deposited build material using the solid radiation body. Post-heating, by the solid radiation body, enables an additional annealing step to be carried out such as to smoothen the surface.

In accordance with a third aspect, the present invention provides an additive manufacturing apparatus comprising at least one of a dispensing head in accordance with the first aspect, or is being configured for performing a method according to the second aspect.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 3A-3D schematically illustrates a solid radiation body in accordance with an embodiment of the present invention in a perspective view (FIGS. 3A and 3C), top view (FIG. 3D) and side view (FIG. 3B);

DETAILED DESCRIPTION

Figure 1:
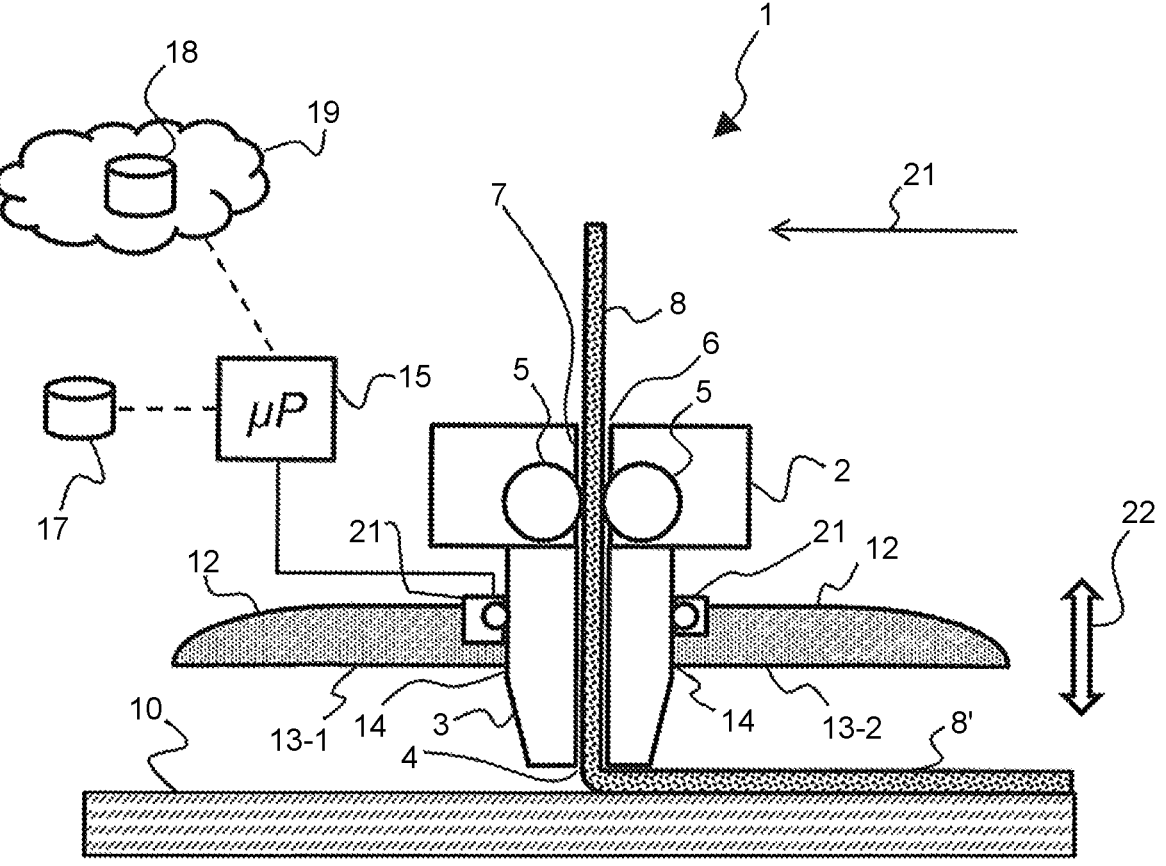
FIG. 1 schematically illustrates a dispensing head in accordance with an embodiment of the present invention.
Figure 6:
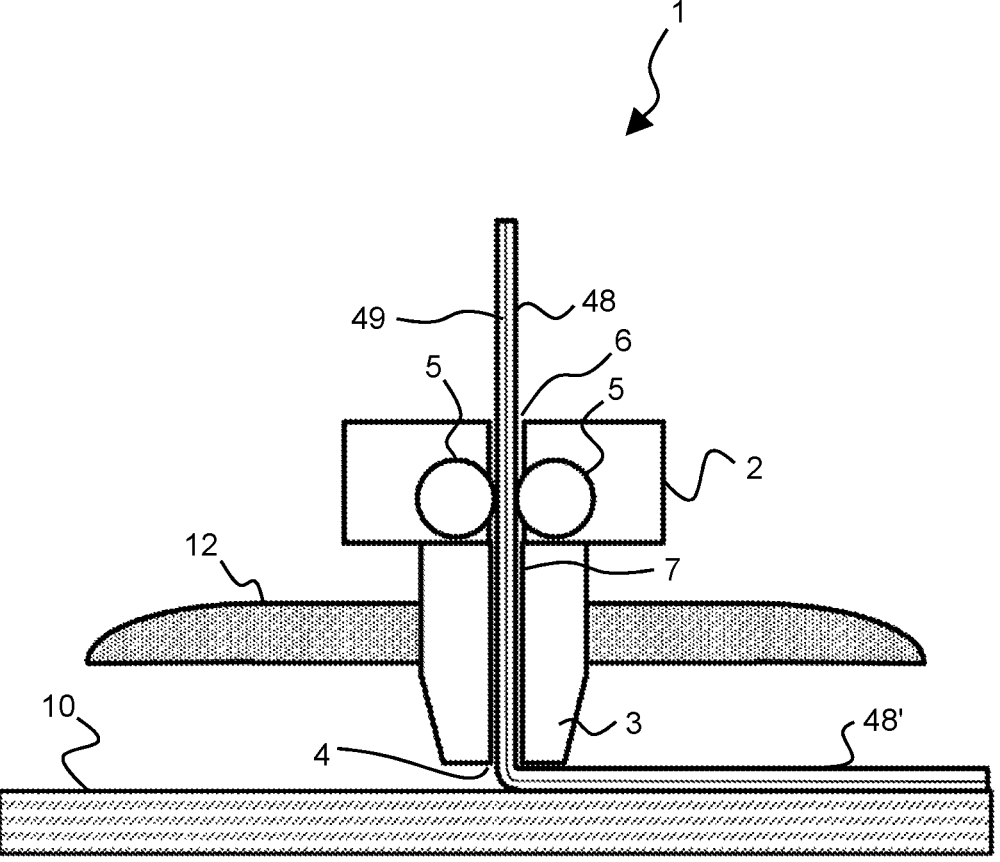
FIG. 6 schematically illustrates a dispensing head in accordance with a further embodiment of the present invention.

FIG. 1 schematically illustrates a dispensing head 1 in accordance with an embodiment of the present invention. The dispensing head 1 may be used for continuous fiber reinforced fused deposition modeling and consists of a basic part 2 and a nozzle part 3. The nozzle comprises a dispensing outlet 4 facing a substrate carrier platform 10 (or substrate in use). The dispensing head 1 comprises a material passage 7 which extends between a receiving inlet 6 and the dispensing outlet 4. The receiving inlet 6 is configured for receiving a strand 8 of fusible solid material, which is to serve as build material 8'. To this end, the build material 8 is to be heated above its melting temperature, and further above its sintering temperature to obtain proper binding of the build material 8' to a previous layer of the substrate to be printed. The strand 8 may comprise a reinforcement fiber embedded therein, as illustrated in FIG. 6. The strand 8 of solid material is driven through the dispensing head 1 via driving means 5 which engage the strand 8 and move it towards the dispensing outlet 4.

In accordance with the present invention, the heating unit of the dispensing head 1 is provided by a solid radiation body 12 which is mounted on the nozzle part 3 of the dispensing head 1. The solid radiation body 12, at least in the travel direction 21 of the dispensing head relative to the carrier platform 10, comprises a radiation face 13-1 which is faced towards the surface of the carrier platform 10 (or the substrate surface in use). Solid radiation body 12 comprises, or cooperates with, a heating unit that heats up the solid radiation body 12 such that the radiation face 13-1 starts radiating heat towards the surface of carrier platform 10. Thereby, radiation from the radiation face 13-1 pre-heats the carrier platform 10 (or, in use, the last printed layer of a substrate) at the location where the dispensing outlet 4 will pass upon moving of the dispensing head 1 in the direction 21. The length over which the solid radiation body 12 extends over the carrier platform in the direction 21, together with the velocity of the dispensing head 1 relative to the carrier platform 10, determines the residence time of the solid radiation body 12 over the carrier platform surface (or substrate surface) prior to dispensing. In turn, this determents the temperature at which the surface of the carrier platform 10 will heat up due to the radiation.

When the dispensing outlet 4 passes over the pre heated surface of carrier platform 10, the dispensed building material 8' will absorb the heat from the surface 10 and be heated form below. By pre heating the surface 10 at least slightly above the sintering temperature of the building material 8, the temperature of the build material 8' will be heated above this sintering temperature resulting in a proper bonding of the build material 8' with the previous layer of the substrate. As may be appreciated, in use it may be desired that a stronger bonding is obtained when the build material 8' is dispensed onto a previous layer of a printed substrate, where as the build material 8' is kept at a slightly lower temperature when it is deposited directly onto the carrier platform 10 (being the first one of the printed layers of the substrate to be printed). This will ensure that the printed subject can be easily separated from the carrier platform after it has been printed, while between the subsequent layers of the printed substrate a strong binding is obtained.

The solid radiation body 12 further comprises an elongated part defining a radiation face 13-2 that extends over the printed build material 8' after it has been deposited. In the travel direction 21 of the dispensing head, the radiation face 13-2 thereby provides post-heating of the building material 8', resulting in a smoothening of the surface by annealing. It will be appreciated, that dispensing head 1 may reverse its direction after it has reached the edge of the substrate to be printed. When the direction of travel indicated by arrow 21 reverses, radiation face 13-2 will be the pre heating radiation face while radiation face 13-1 will become the post heating radiation face.

Preferably, at the mounting edge 14 where the solid radiation body 12 is mounted to the nozzle part 3 of the dispensing head 1, a thermally isolating element is present to prevent heat from the solid radiation body 12 to heat up the dispensing head 1. This results in proper temperature control, preventing dissipation of heat through the dispensing head 1, while also enabling the solid material 8 to be kept below melting temperature.

In accordance with some embodiments of the present invention, a height adjustment actuator 21 may be present on either one of the dispensing head 1 or the solid radiation body 12 which allows to control the height of the solid radiation body 12 above the surface of the carrier platform 10 (or the substrate surface in use). The height adjustment actuator 21 may be controlled via a microprocessor or controller 15. For example, the height adjustment actuator may be controlled such as to increase the height of the solid radiation body 12 over the surface of the carrier platform 10 in order to lower the temperature at the surface 10, or to prevent overheating of certain parts of the substrate where the amount of printed material is limited (e.g. the areal density of the printed material is lower). For example, the substrate to be printed consisting of edges which are separated by voids (e.g. a container part more or like) comprises areas with hardly any building material, and some areas with edges with limited amount of building material. When the areal density of printing material varies, the controller 15 may control the height of the solid radiation body 12 by controlling the height adjustment actuator 21, based on printing data of the layer to be printed or the previous layer which may be obtained from the memory 17 or from a network attached storage or cloud memory 18 accessible through a network 19. The height in FIG. 1 is indicated by arrow 22.

Figure 2:
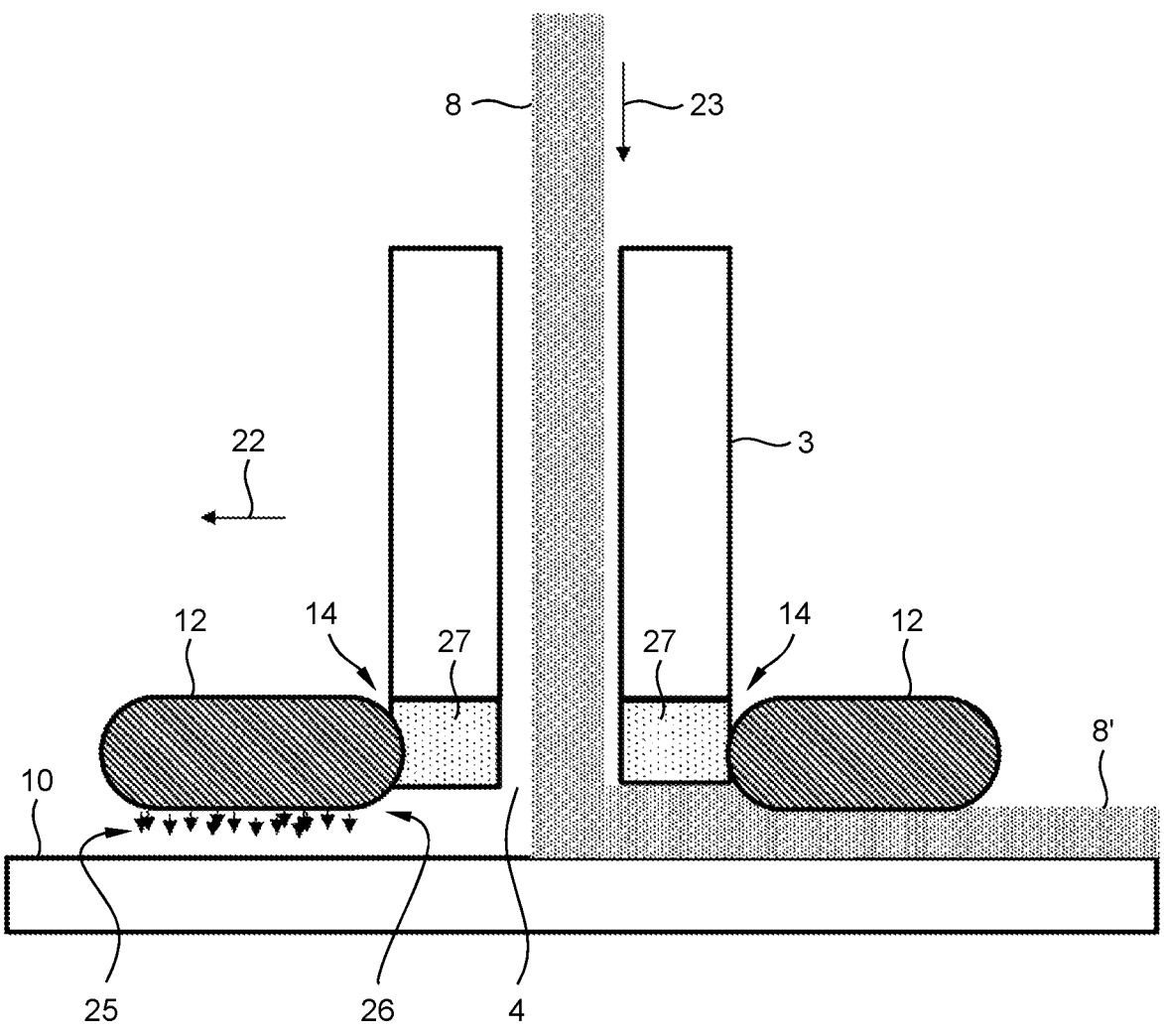
FIG. 2 schematically illustrates a nozzle of a dispensing head in accordance with the further embodiment of the present invention.

FIG. 2 illustrates a further embodiment of a dispensing head in accordance with the present invention. In FIG. 2, a solid radiation body 21 is installed on the nozzle part 3 of a dispensing head. As illustrated, in the mounting area 14 a thermally isolating element 27 prevents the forming of a heat bridge between the nozzle part 3 and the solid radiation body 12. Therefore, as a result of the thermally isolating elements 27, the temperature of the solid radiation body 12 can be independently controlled and set from any operating temperature in the dispensing head 1.

Further illustrated in FIG. 2 is the height radiation provided by the solid radiation body 12 that preforms the pre-heating of the surface of carrier platform 10. The heat radiation is schematically illustrated by the arrows 25. The travel direction of the dispensing head 1 over the carrier platform is indicated by arrow 22. Arrow 23 illustrates the travel direction of the material 8 to be used as building material 8' after dispensing.

In the embodiment of FIG. 2, the solid radiation body 12 may for example be formed by or comprise a ring shaped element (e.g. such as the ring shaped element to be discussed in FIG. 5 below). Such an element may be present near the mounting area 14 of the solid radiation body 12 on the nozzle part 3, to provide a graduate decrease in height that forms a compacting area 26. In the travel direction 22, the compacting area 26 of the trailing part of the solid radiation body 12 thereby exerts a pressure on the building material 8'. This has the effect of any voids or air to be pressed out of the molting building material 8'. Preferably, but not essential, the compacting area, as illustrated in FIG. 2, is located near the dispensing outlet 4 of the dispensing head. As a result, the pressure is exerted at a location where the upper part of the building material 8' is still relatively cold (note that the building material 8' is heated from below by the pre heated surface 10). This is beneficial to the pressing out of any voids out of the building material 8'.

FIGS. 3A-3D illustrate various views of the solid radiation body in accordance with the embodiment of the present invention. As illustrated in FIG. 3A, the solid radiation body 12 comprises a plurality of legs 30 which allow a dispensing head to be moved in different directions relative to a substrate or carrier platform. Counting the forward and backward direction as separate directions, the total of eight legs 30 in the embodiment illustrated in FIG. 3A, allows the dispensing head to travel in eight different directions (four main directions in either forward or backward direction). In the middle, the solid radiation body comprises a housing element 33 wherein elements such as actuators and/or heaters may be housed. FIG. 3B provides a fined view of the solid radiation body 12 of FIG. 3A. As can be seen, the housing element 33 comprises two heating elements 35 which allow to heat up the solid radiation body 12. FIG. 3A also shows the dispensing outlet 4 in the middle of the solid radiation body 12. In FIG. 3B, in the embodiment illustrated in these figures, a mounting structure 34 is illustrated which allows mounting of the solid radiation body to a dispensing head.

FIGS. 3C and 3D illustrate a top view of the radiation body 12 (including a prospective view) showing the mounting structure 34 having an internal material passage 7 towards the dispensing outlet 4. The figures also illustrate a rotation actuator which allow for rotation of the solid radiation body to align the legs 30 in a different direction, or to adjust their alignment properly. The rotation actuator 37 may be controlled by the controller 15, and will be explained later. The movability of the dispensing head in many different directions is advantageous, in particular for fused deposition modeling and continuous fiber reinforced fused deposition modeling, as it prevent that the dispensing of the strand of material has to be interrupted often.

Figure 4:
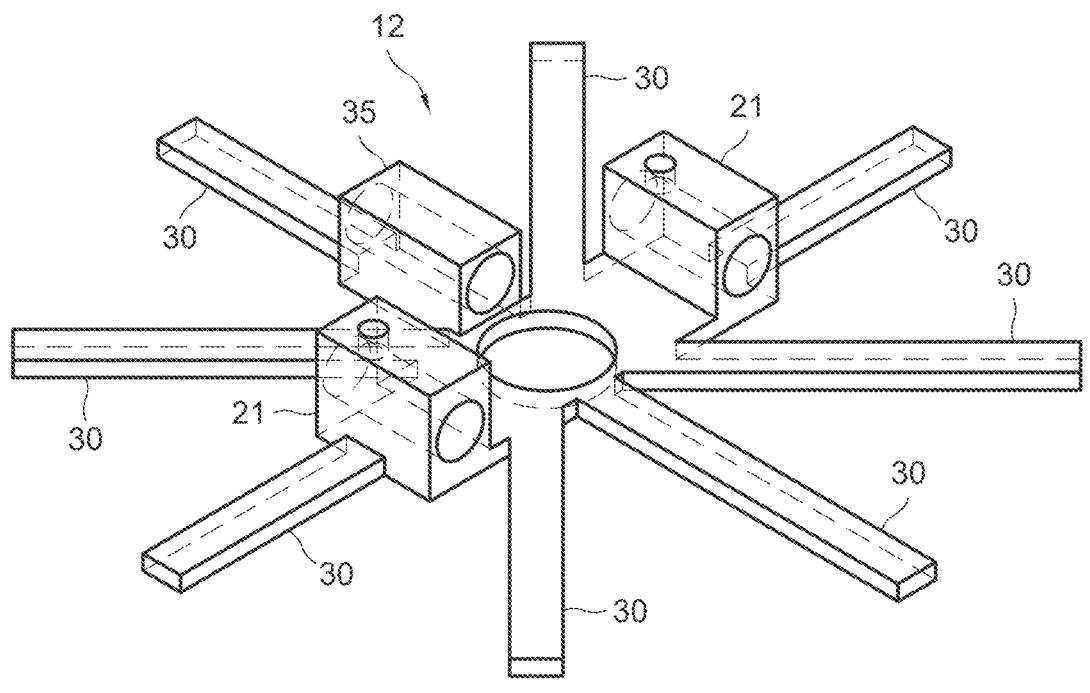
FIG. 4 schematically illustrates a solid radiation body in accordance with a further embodiment of the present invention.

FIG. 4 illustrates a further embodiment of a solid radiation body 12 of the present invention, illustrating the legs 30. Also shown are the locations 21 wherein a height adjustment actuator may be mounted for adjusting the height of the solid radiation body above a carrier platform 10. In the embodiment illustrated in FIG. 4, a single heating element 35 allows heating to solid radiation body to desired temperature.

Figure 5:
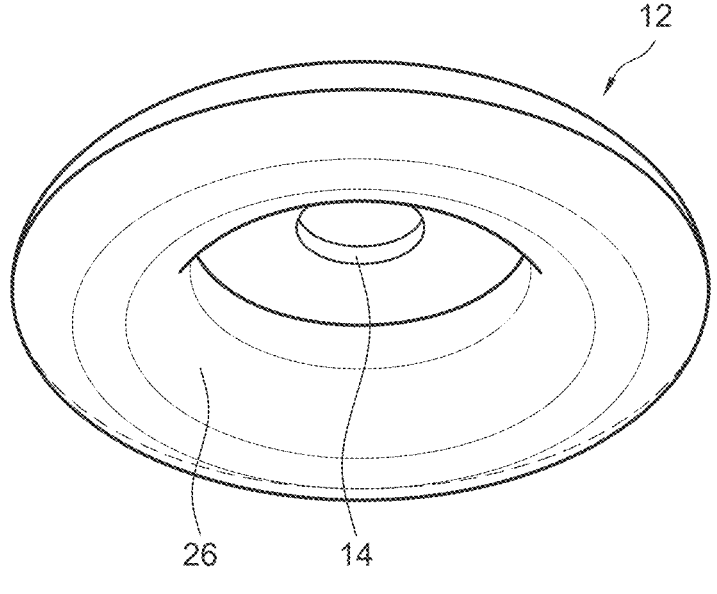
FIG. 5 schematically illustrates a solid radiation body in accordance with a further embodiment of the present invention.

FIG. 5 schematically illustrates a disk shape element that may be applied as solid radiation body of its own. The use of a disk shape element allows for the relative travel of the dispensing head in any desired direction, without the need for a rotation actuator. The element of FIG. 5 is shaped such as to provide a compacting area 26 after dispensing of the building material 8'. As one may appreciate, the disk shape element illustrated in FIG. 5 may also be part of a larger solid radiation body, for example forming a central part thereof.

Figure 7:
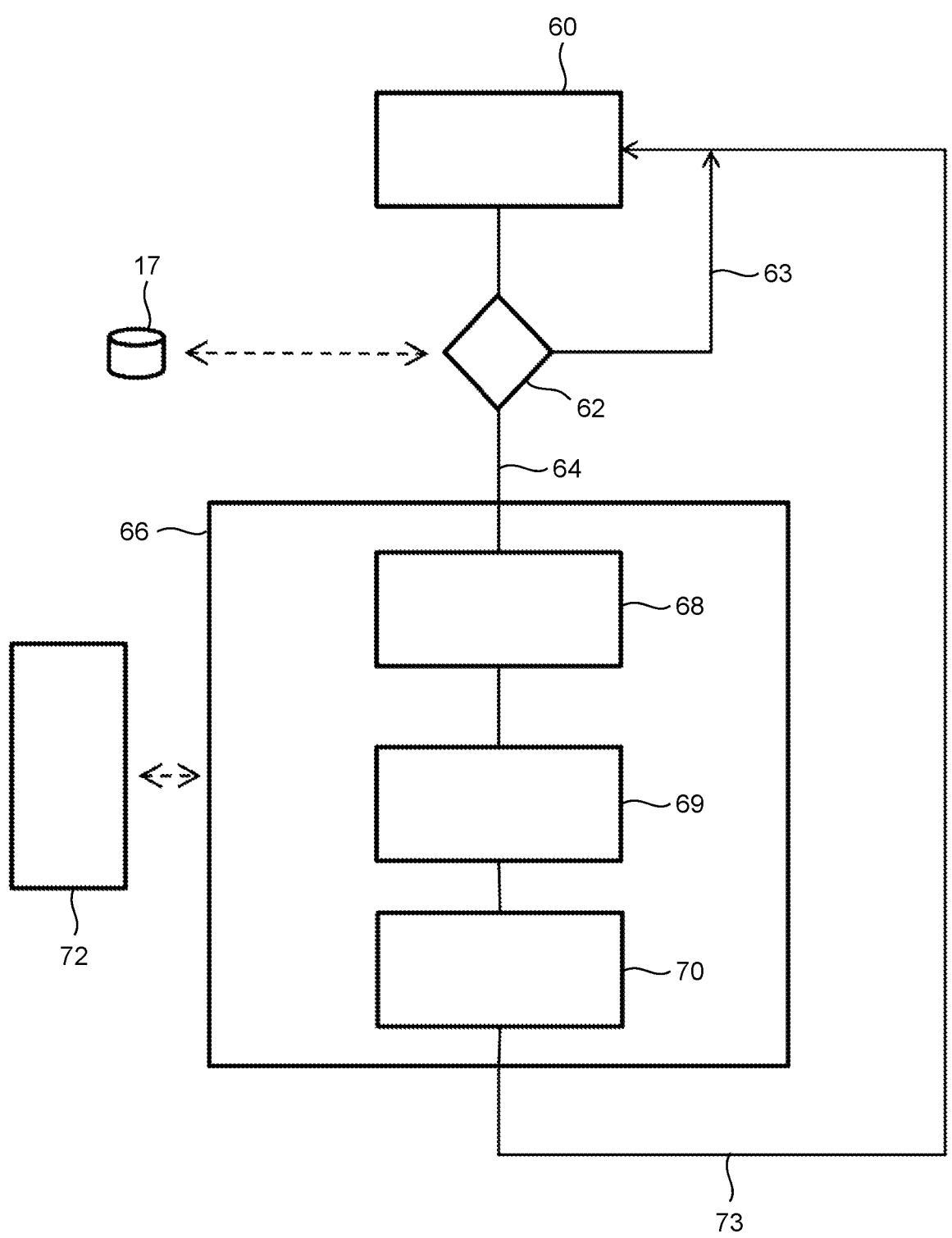
FIG. 7 schematically illustrates a method of manufacturing an object in accordance with an embodiment of the present invention.
Figure 8:
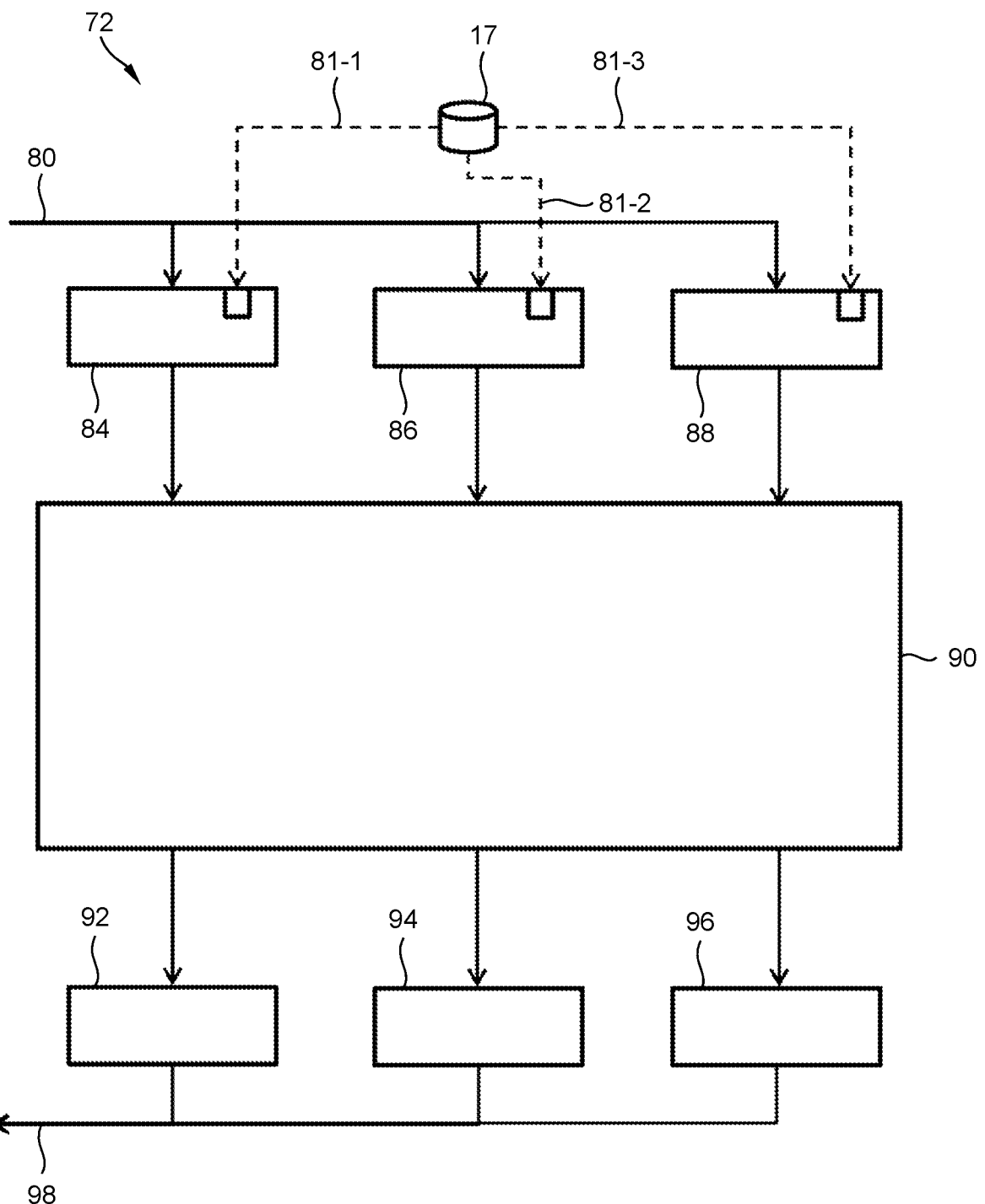
FIG. 8 schematically illustrates a control step of a method of the present invention, such as the method of FIG. 7.

Various embodiments of dispensing head are further illustrated in FIGS. 6 through 8, each having its own characteristics or features that may be present in the dispensing heads of the present invention. The present invention is not limited to these embodiments. The various characteristic elements of these embodiments may be present in any of the other embodiments, and are merely illustrated for illustration here.

A further embodiment of the present invention is illustrated in FIG. 6. The dispensing head 1 of FIG. 6 does not differ very much from the dispensing head illustrated in FIG. 1, but is applied, or is arranged for performing continuous fiber reinforced fused deposition modelling. To this end, the strand of material to be fed into the receiving inlet of the dispensing head 1, may be a strand 48 comprising an already embedded reinforcement fiber 49. The working of the dispensing head 1 illustrated in FIG. 7 is similar to the working of the dispensing head illustrated in FIG. 1. The solid radiation body 12 pre-heats the surface of the carrier platform 10 (or the upper surface of the substrate to be printed, in use) and the building material 48' after it has left the dispensing outlet 4, is heated from below such as to reach a temperature above the sintering temperature. Optionally a compacting area 26 may be present near the dispensing outlet 4 for exerting a pressure on the deposited building material 48 in a same manner as described further above.

FIG. 7 schematically illustrates a method in accordance with an aspect of the present invention. In FIG. 7, the method starts with a movement step 60 of the dispensing head relative to the carrier platform 10. During the movement step 60, the dispensing head 1 reaches a new location above the surface of the carrier platform 10. In step 62, it is decided whether or not at that location building material is to be printed. As input to this process, the dispensing head receives printing data from the memory 17 for the layer to be printed. If no building material needs to be printed, the decision step (via arrow 63) goes back to step 60 such as to move the dispensing head 1 to a new location. Otherwise the method continues via branch 64. In step 66 the dispensing head dispenses building material onto the substrate surface. The dispensing step 66 comprises the following sub-steps. In step 68 the dispensing head 1 receives the strand of solid material via the receiving inlet. In step 69 the material is driven, using the driving actuator 5, through the material passage 7 towards the dispensing outlet 4. Then in step 70, the building material is dispensed onto the surface and is heated by the already pre-heated surface of the carrier platform 10. The heating step 70 includes a pre-heating step of the substrate surface or carrier platform 10 by radiating heat using a solid radiation body 12 as described above. In accordance with the method of the present invention, the solid radiation body 12 is thermally isolated from the dispensing outlet 4. The pre-heating, dispensing of material onto the surface and post-heating is controlled by a controller in controlling step 72. Controlling step 72 is further described herein below with reference to FIG. 8. After step 66, via branch 73, the method continues in step 60 where the dispensing head 1 moves to a new location.

As referred to above, FIG. 8 schematically illustrates the control of the dispensing method in accordance with the present invention. In step 72, various parts and operational parameters of the dispensing head are controlled by the controller 15. The controlling step 72 mainly relies on printing data as input, which is illustrated by the dotted arrows 81-1, 81-2 and 81-3 to the various steps 84, 86 and 88. Furthermore, the controller relies on other input such as sensor data and operational data available, which other input is schematically indicated by arrow 80 to each of the steps 84, 86 and 88. In step 84, the controller estimates the residence time of the dispensing head above an area of the substrate surface or substrate carrier platform. This is estimated on the basis of printing data 81-1 and on the relative velocity of the dispensing head 1 relative to the substrate surface which is received as operational data via input 80. In step 86, the controller uses printing data 81-2 to determine an areal density of printed material in an area surrounding a deposition location on the substrate surface. The deposition location is received as input 80 as an operational parameter. Additionally, printing data from earlier layers may also be used for determining the amount of printed material underneath the layer to be printed.

In step 88, the controller 15 determines a direction of relative motion between the dispensing head and the substrate carrier platform. To this end, the controller may receive the present direction of motion as an operational parameter from the input 80 and from the printing data it may determine whether this direction of motion is to be continued with. The output of steps 84, 86 and 88 may serve as input to step 90, wherein the controller determines how to control or adapt the printing operation. For example, the controller may determine a desired temperature at the substrate surface and from there may determine how the height of the solid radiation body may need to be increased or decreased, how the temperature of the solid radiation body 12 may be adapted, or whether the solid radiation body 12 may need to be rotated to align with a new travel direction. In steps 92, 94 and 96 the controller 15 provides instructions for adapting the operation of the various elements, such as the heating element 35 of the solid radiation body (in step 92), the height adjustment actuator 21 for adjusting the height of the solid radiation body 12 (in step 94) and the rotation actuator for changing the alignment rotation of the solid radiation body 12 (in step 96). These instructions are provided as output 98 back to the dispensing head 1.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A dispensing head for continuous fiber reinforced fused filament type additive manufacturing, the dispensing head being configured for dispensing a material onto a substrate carrier platform of an additive manufacturing apparatus, the dispensing head comprising:
   one or more inlets for receiving at least a strand of meltable solid material and a reinforcement fiber;
   a dispensing outlet for dispensing the meltable solid material with the reinforcement fiber to serve as build material;
   at least one passage extending from the one or more receiving inlets to the dispensing outlet, wherein the at least one passage includes a material passage;
   a material heating unit for liquefying the meltable solid material, and
   a drive configured to drive the meltable solid material through the material passage by engagement of the strand of meltable solid material,
   wherein the material heating unit comprises a solid radiation body:
      mounted to the dispensing outlet so as to extend therefrom at least in a direction parallel to the substrate carrier platform in use, and
      defining a radiation face toward the substrate carrier platform,
   wherein the dispensing head further comprises a thermally isolating element mounted to the dispensing outlet, such that the solid radiation body is thermally separated from the dispensing outlet.

2. The dispensing head according to claim 1, wherein the reinforcement fiber is embedded in the strand of meltable solid material, and
   wherein at least one receiving inlet, of the one or more inlets, is configured for receiving the strand of meltable solid material including the reinforcement fiber embedded therein.

3. The dispensing head according to claim 1, wherein the solid radiation body is shaped so as to, from the dispensing outlet in a radial direction, gradually decrease height of the radiation face above the substrate carrier platform or a substrate surface located thereon, so as to provide a compacting area for exerting pressure on build material deposited thereon.

4. The dispensing head according to claim 1, further comprising a compacting element,
   wherein the compacting element is thermally isolated from the solid radiation body so as to maintain the compacting element at a lower temperature than the temperature of the solid radiation body in use,
   wherein the compacting element comprises a compacting surface facing the substrate carrier platform, and
   wherein the compacting element is shaped so as to, from the dispensing outlet in a radial direction, gradually decrease the height of the compacting surface above the substrate carrier platform or a substrate surface located thereon.

5. The dispensing head according to claim 4, wherein the compacting element is located adjacent the dispensing outlet so as to exert a compacting pressure on the material deposited.

6. The dispensing head according to claim 1, wherein the solid radiation body extends from the dispensing outlet in at least one direction defining a relative travel direction of the dispensing head relative to the substrate carrier platform in use, such that the radiation body extends in at least one of a forward or backward direction with respect to the relative travel direction in use.

7. The dispensing head according to claim 1, wherein the solid radiation body is made of a material taken from the group consisting of: a metal, a ceramic, and a thermosetting polymer.

8. The dispensing head according to claim 1, further comprising a height adjustment actuator,
   wherein the height adjustment actuator cooperatively operates with the solid radiation body to adjust height of the radiation face above the substrate carrier platform or a substrate surface located thereon,
   wherein the height adjustment actuator is configured to be controlled by a controller for adjusting said height dependent on an areal density of printed material in an area surrounding a deposition location on the substrate surface in use.

9. The dispensing head of claim 5, wherein the compacting element is circumferentially arranged around the dispensing outlet.

10. The dispensing head according to claim 1, wherein the solid radiation body is made of a metal, and
   wherein the radiation face of the radiation body comprises a metal oxide surface.

11. The dispensing head according to claim 1, wherein the solid radiation body is made of a metal, and
   wherein the radiation face comprises a coating layer of a material providing the radiation body with an emissivity in excess of an emissivity of the metal.

\* \* \* \* \*